US007985709B2

(12) United States Patent
Jordan et al.

(10) Patent No.: US 7,985,709 B2
(45) Date of Patent: Jul. 26, 2011

(54) METHODOLOGY FOR THE EFFECTIVE STABILIZATION OF TIN-OXIDE-BASED OXIDATION/REDUCTION CATALYSTS

(75) Inventors: Jeffrey D. Jordan, Williamsburg, VA (US); David R. Schryer, Hampton, VA (US); Patricia P. Davis, Yorktown, VA (US); Bradley D. Leighty, Gloucester, VA (US); Anthony N. Watkins, Hampton, VA (US); Jacqueline L. Schryer, Hampton, VA (US); Donald M. Oglesby, Virginia Beach, VA (US); Suresh T. Gulati, Elmira, NY (US); Jerry C. Summers, Charleston, WV (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1910 days.

(21) Appl. No.: 10/956,515

(22) Filed: Sep. 28, 2004

(65) Prior Publication Data
US 2005/0079115 A1    Apr. 14, 2005

Related U.S. Application Data

(62) Division of application No. 10/056,845, filed on Jan. 22, 2002, now Pat. No. 7,390,768.

(51) Int. Cl.
B01J 23/00 (2006.01)
B01J 21/00 (2006.01)
B01J 20/00 (2006.01)

(52) U.S. Cl. ....... 502/326; 502/242; 502/243; 502/261; 502/262; 502/302; 502/303; 502/304; 502/339; 502/344; 502/347; 502/349; 502/352; 502/439

(58) Field of Classification Search .......... 502/302, 502/303, 304, 326, 327, 330, 332, 339, 344, 502/347, 348, 349, 352, 355, 415, 439, 242, 502/243, 261, 262
See application file for complete search history.

(56) References Cited

U.S. PATENT DOCUMENTS

| | | | | |
|---|---|---|---|---|
| 4,014,783 A * | 3/1977 | Rausch | ............ | 208/255 |
| 4,077,913 A | 3/1978 | Acres et al. | | |
| 4,088,435 A * | 5/1978 | Hindin et al. | ............ | 431/7 |
| 4,146,438 A * | 3/1979 | de Nora et al. | ............ | 205/43 |
| 4,162,235 A | 7/1979 | Acres et al. | | |
| 4,220,559 A | 9/1980 | Polinski | | |
| 4,237,032 A * | 12/1980 | Evans et al. | ............ | 502/303 |
| 4,294,726 A * | 10/1981 | Bozon et al. | ............ | 502/304 |
| 4,419,278 A * | 12/1983 | Gordon | ............ | 252/501.1 |
| 4,426,319 A | 1/1984 | Blanchard et al. | | |
| 4,492,769 A * | 1/1985 | Blanchard et al. | ............ | 502/262 |
| 4,537,873 A * | 8/1985 | Kato et al. | ............ | 502/242 |
| 4,829,035 A | 5/1989 | Upchurch et al. | | |
| 4,839,330 A | 6/1989 | Hess et al. | | |
| 4,855,274 A | 8/1989 | Upchurch et al. | | |
| 4,912,082 A | 3/1990 | Upchurch et al. | | |
| 4,991,181 A | 2/1991 | Upchurch et al. | | |
| 5,053,378 A * | 10/1991 | Blanchard et al. | ............ | 502/304 |
| 5,075,275 A * | 12/1991 | Murakami et al. | ............ | 502/303 |
| 5,082,820 A * | 1/1992 | Mitsui et al. | ............ | 502/350 |
| 5,306,684 A | 4/1994 | Itch et al. | | |
| 5,413,976 A | 5/1995 | Takami et al. | | |
| 5,516,741 A * | 5/1996 | Gascoyne et al. | ............ | 502/230 |
| 5,585,083 A | 12/1996 | Kielin et al. | | |
| 5,593,935 A * | 1/1997 | Golunski et al. | ............ | 502/339 |
| 5,643,545 A | 7/1997 | Chen et al. | | |
| 5,788,950 A * | 8/1998 | Imamura et al. | ............ | 423/263 |
| 5,883,037 A | 3/1999 | Chopin et al. | | |
| 5,899,678 A | 5/1999 | Thomson et al. | | |
| 5,939,220 A | 8/1999 | Gunner et al. | | |
| 5,948,965 A | 9/1999 | Upchurch et al. | | |
| 5,990,039 A * | 11/1999 | Paul et al. | ............ | 502/326 |
| 5,997,830 A | 12/1999 | Itch et al. | | |
| 6,017,844 A * | 1/2000 | Wu et al. | ............ | 502/214 |
| 6,037,307 A * | 3/2000 | Campbell et al. | ............ | 502/325 |
| 6,080,375 A | 6/2000 | Mussman et al. | | |
| 6,121,187 A * | 9/2000 | Maier | ............ | 502/232 |
| 6,132,694 A | 10/2000 | Wood et al. | | |
| 6,159,897 A | 12/2000 | Suzuki et al. | | |
| 6,174,835 B1 | 1/2001 | Naito et al. | | |
| 6,211,113 B1 * | 4/2001 | Harth et al. | ............ | 502/200 |
| 6,214,307 B1 | 4/2001 | Okumura et al. | | |
| 6,235,673 B1 * | 5/2001 | Zoeller et al. | ............ | 502/159 |
| 6,239,063 B1 | 5/2001 | Bogdan | | |
| 6,265,342 B1 * | 7/2001 | Lim et al. | ............ | 502/326 |
| 6,306,359 B1 * | 10/2001 | Mathieu et al. | ............ | 423/588 |
| RE37,663 E * | 4/2002 | Golunski et al. | ............ | 502/339 |
| 6,482,766 B1 * | 11/2002 | Chaumette et al. | ............ | 502/242 |
| 6,495,487 B1 * | 12/2002 | Bogdan | ............ | 502/227 |
| 6,548,447 B1 * | 4/2003 | Yokoyama et al. | ............ | 502/331 |
| 6,576,804 B1 * | 6/2003 | Heineke et al. | ............ | 585/661 |
| 6,685,899 B1 * | 2/2004 | Park | ............ | 423/213.5 |
| 6,846,773 B1 * | 1/2005 | Yokoyama et al. | ............ | 502/339 |
| 2001/0012502 A1 | 8/2001 | Okumura et al. | | |

* cited by examiner

Primary Examiner — Cam N. Nguyen
(74) Attorney, Agent, or Firm — Andrea Z. Warmbier; Helen M. Galus

(57) ABSTRACT

The invention described herein involves a novel approach to the production of oxidation/reduction catalytic systems. The present invention serves to stabilize the tin oxide reducible metal-oxide coating by co-incorporating at least another metal-oxide species, such as zirconium. In one embodiment, a third metal-oxide species is incorporated, selected from the group consisting of cerium, lanthanum, hafnium, and ruthenium. The incorporation of the additional metal oxide components serves to stabilize the active tin-oxide layer in the catalytic process during high-temperature operation in a reducing environment (e.g., automobile exhaust). Moreover, the additional metal oxides are active components due to their oxygen-retention capabilities. Together, these features provide a mechanism to extend the range of operation of the tin-oxide-based catalyst system for automotive applications, while maintaining the existing advantages.

17 Claims, No Drawings

METHODOLOGY FOR THE EFFECTIVE STABILIZATION OF TIN-OXIDE-BASED OXIDATION/REDUCTION CATALYSTS

CROSS-REFERENCE TO RELATED APPLICATION

This application is a divisional patent application of commonly owned, patent application Ser. No. 10/056,845, filed Jan. 22, 2002, which issued as U.S. Pat. No. 7,390,768 B2 on Jun. 24, 2008.

ORIGIN OF THE INVENTION

This invention was jointly made in part by employees of the United States Government and may be manufactured and used by and for the Government of the United States for governmental purposes without the payment of royalties thereon or therefor.

FIELD OF THE INVENTION

This invention relates generally to oxidation/reduction catalysts. It relates particularly to an improved process to stabilize low-temperature, tin-oxide-based oxidation/reduction catalysts.

DESCRIPTION OF THE RELATED ART

Automotive catalytic converter technology has changed little since its inception over 25 years ago when automotive emission regulations were first implemented. Typical catalyst coatings consist of a series of aluminum oxide (alumina) washcoat- and precious-metal layers baked on the honeycomb channels of a ceramic substrate. The thick (~150 microns) catalyst coating comprises approximately 30% of the total weight of the substrate. These coated "bricks" are then assembled and sealed inside a stainless steel can to allow coupling to the automotive exhaust manifold. As EPA emission regulations have tightened, the industry response has been to increase the size of the bricks, increase precious metal loading, and move the catalytic converter in closer proximity to the engine, thereby increasing exhaust temperatures for improvement in catalytic activity. The outcome of these changes has been ever increasing costs for catalytic converter products. In addition, these changes have had a negative impact on automobile fuel efficiency.

In response to the need for the next generation of catalysts for automotive applications, low-temperature oxidation catalysts were developed by NASA Langley Research Center. These improved catalysts are described in U.S. Pat. Nos. 4,829,035; 4,839,330; 4,855,274; 4,912,082; 4,991,181; 5,585,083; 5,948,965; and 6,132,694 and are hereby incorporated by reference as if set forth in its entirety herein. These catalysts exhibit several key advantages over the current state-of-the-art. First, unlike the thick, inert layer of alumina used in conventional catalyst technology, these catalysts use a single active tin oxide coating (<5 microns) that enhance the catalytic performance by acting as an oxygen storage device. Second, their active washcoat reduces the temperature (i.e., light off) at which the catalyst begins converting toxic to nontoxic gases, as well as, requiring less precious metal to attain the same toxic gas conversion efficiency over time. Third, these catalysts are capable of capturing enough oxygen from the natural exhaust stream to complete the chemical reactions. Unlike traditional catalytic converter technology, external air sources and the ancillary sensors, air pumps, and hoses are not required for catalytic converter operation. Finally, their catalytic formulation is a unique combination of precious metal and promoter chemistries that render it 25-40% less expensive in material cost per gram and less dependent on expensive materials like platinum, palladium, or rhodium than current technologies.

The successful transition of the low-temperature oxidation catalyst technology for internal combustion engine emission applications is dependent on achieving efficient destruction of primary exhaust pollutants: volatile organic compounds, including hydrocarbons (HC), carbon monoxide (CO), and nitrogen oxides (NOx) over extended operational periods. For example, the catalyst must serve to oxidize HC and CO to water and carbon dioxide, and reduce the NOx species to molecular nitrogen. The EPA and California Air Research Bureau (CARB) certification of automotive catalytic converter systems require a catalyst technology to meet minimum performance requirements for a period commensurate with its final application. Gasoline-powered automobile after market catalysts, for example, must currently eliminate 70% of emitted carbon monoxide (CO), 70% hydrocarbons (HC), and 60% nitrogen oxides (NOx) for a period of 25,000 miles operation (Original Equipment (OE) market>100,000 miles). Product durability is evaluated through approved rapid aging tests (RAT) that involve subjecting the catalyst to the emissions stream of a full-scale automobile engine operating under elevated inlet temperatures (e.g., 850° C.) and varying fuel-to-air ratios ranging from rich to lean relative to stoichiometric (i.e., ideal) operational conditions. Catalytic converter performance is characterized by the efficiency of the conversion process and product durability in maintaining mandated pollutant destruction levels. These tests involve subjecting the catalyst to an automobile exhaust emission stream under various operating conditions (e.g., drive cycles) and elevated inlet temperatures.

Despite their improvement over existing catalysts, the improved, low-temperature tin-oxide catalysts failed to maintain the minimum pollutant destruction levels following 5,000 and 10,000 mile simulated operation. Investigations reveal evidence of thermally induced reorganization that resulted in the reduced performance. Thus, despite the significant advancement of the improved catalysts over the current technology, these catalysts require greater thermal stability to extend durability.

SUMMARY OF THE INVENTION

The purpose of the invention described herein is to significantly enhance the thermal stability of the existing low-temperature, oxidation/reduction catalyst, originally developed for use in internal combustion engine emissions applications, described generally in U.S. Pat. Nos. 4,829,035; 4,839,330; 4,855,274; 4,912,082; 4,991,181; 5,585,083; 5,948,965; and 6,132,694. The present invention serves to stabilize the tin oxide reducible metal-oxide coating by co-incorporating at least another metal-oxide species, such as zirconium. In at least one embodiment, a third metal-oxide species is incorporated, selected from the group consisting of cerium, lanthanum, haflium, and ruthenium. The incorporation of the additional metal oxide components serves to stabilize the active tin-oxide layer in the catalytic process during high-temperature operation in a reducing environment (e.g., automobile exhaust). Moreover, the additional metal oxides are active components due to their oxygen-retention capabilities. Together, these features provide a mechanism to extend the range of operation of the tin-oxide-based catalyst system for automotive applications, while maintaining the existing advantages (e.g., better cold start performance and lower cost due to lower precious metal loading and thinner coatings.)

DETAILED DESCRIPTION OF THE INVENTION

The catalyst composite can be created by mixing metal-oxide precursor solutions, either neat or in a compatible solvent, and applying the solution to a substrate. In one embodiment, the metal-oxide precursor solution is tin, cerium, zirconium-(II) ethyl hexanoate and the compatible solvent is methyl ethyl ketone [MEK]. In this embodiment the mass ratio for the tin:cerium:zirconium is 1.0:0.5:0.5. For automotive applications, the substrate can, for example, be a honeycomb-structured ceramic or metal and the coating application can be performed by a single dip-deaerate-dip sequence. Following the application, the catalyst coating can be thermally treated through various programs to eliminate solvent and convert the mixed-metal precursor solution to a mixed-metal oxide coating. In at least one embodiment, promoter metal species, selected from the group consisting of oxides of the metals of the transition series of the periodic table of elements (e.g., iron, cobalt, nickel) are then applied by dipping in aqueous metal nitrate solutions followed by an additional thermal treatment. Noble metal species, selected from the group consisting of platinum, palladium, gold, silver, and rhodium, are then applied from aqueous solutions directly to the coating channels quantitatively. This can be done by using a Pasteur pipette followed by a final thermal treatment. In at least one embodiment, the noble metal comprises from about 1 to about 50 weight percent, based on the total weight of the catalyst and the metal oxides comprise from about 50 to about 99 weight percent, based on the total weight of the catalyst. The promoter may be present in an amount sufficient to provide from about 1 to about 12 atom percent of promoter metal to tin metal.

In the conventional mode of catalyst preparation, multiple layers of the inactive support (e.g., alumina) are applied to a substrate material (e.g., cordierite, silica gel) by successive wash coating of a slurry of particles dispersed in a solvent (e.g., alcohol). The mechanism for adherence is simple absorption of material, relying heavily on the predilection of smaller particles to penetrate and absorb to the porous regions of the substrate to form an anchor for subsequent layers. In contrast, the mixed metal (e.g., Sn, Ce, Zr) precursor solutions can readily penetrate the porous cracks and fissures in the substrate material, chemically bonding to the surface through a condensation mechanism with surface hydroxyl groups. The result of this approach is significant improvements in catalyst adherence, catalytic efficiency/surface area, and durability (temperature stability). In at least one embodiment, the reducible metal oxide active layer is produced by applying a homogeneous solution of tin ethylhexanoate (SnEH), cerium (II) ethylhexanoate (CeEH), and zirconium (II) ethylhexanoate (ZrEH) to the substrate and oxidizing the absorbed and adsorbed SnEH/CeEH/ZrEH to a tin oxide ($SnO_2$)/ceria/zirconia composite by heating to high temperature (550-800° centigrade). This produces catalyst materials that are stable under high-temperature operation in reducing environments.

The disclosed methodology for the preparation of oxidation and reduction catalysts exhibiting greater efficiency and durability will positively affect applications besides catalytic converters for internal combustion/automotive applications. These applications include, but are not limited to, air purification/HVAC systems, and gas phase sensing technologies.

It should be understood that the foregoing description and examples are only illustrative of the invention. Various alternatives and modifications can be devised by those skilled in the art without departing from the invention. Accordingly, the present invention is intended to embrace all such alternatives, modifications, and variances that fall within the scope of the appended claims.

The invention claimed is:

1. A method for preparing a stabilized oxidation and reduction catalyst comprising the steps of:
   preparing a mixed-metal oxide precursor solution, the mixed-metal oxide precursor solution comprising a solution of tin ethylhexanoate (SnEH), cerium (II) ethylhexanoate (CeEH) and zirconium (II) ethylhexanoate (ZrEH);
   applying the mixed-metal oxide precursor solution to a substrate, wherein the substrate does not include an aluminum compound;
   treating the precursor solution to convert the mixed-metal oxide precursor solution to a mixed-metal oxide active layer, the step of treating the precursor solution to convert the mixed-metal oxide precursor solution to a mixed-metal oxide active layer further comprising the step of oxidizing absorbed and adsorbed SnEH, CeEH and ZrEH to a tin oxide ($SnO_2$)/ceria/zirconia composite by heating the precursor solution; and
   dispersing a noble metal selected from the group consisting of platinum, palladium. gold, silver, and rhodium, on the surface of the mixed-metal oxide active layer.

2. The method according to claim 1, further comprising the step of adding at least one promoter metal selected from the group consisting of oxides of the metals of the transition series of the periodic table of elements, prior to the dispersing step.

3. The method according to claim 2, wherein said step of adding at least one promoter metal comprises the steps of:
   dipping the substrate in at least one aqueous metal nitrate solution; and
   thermally treating the substrate.

4. The method according to claim 3, wherein said step of preparing a mixed-metal oxide precursor solution comprises one of the following:
   mixing metal oxide precursor solutions; or
   mixing metal oxide precursor solutions in a solvent.

5. The method according to claim 4 wherein said step of treating the precursor solution to convert the mixed-metal oxide precursor solution to a mixed-metal oxide active layer comprises at least one step of thermally treating the catalyst to eliminate solvent and to convert the mixed-metal oxide precursor solution to a mixed-metal oxide coating.

6. The method according to claim 5 wherein said step of dispersing a noble metal selected from the group consisting of platinum, palladium, gold, silver, and rhodium, on the surface of the mixed-metal oxide active layer comprises the steps of:
   quantitatively applying the noble metal from an aqueous solution directly to the mixed metal oxide coating; and
   thermally treating the catalyst.

7. The method according to claim 2, wherein the noble metal is about 1 to about 50 weight percent, based on the total weight of the mixed-metal oxide active layer and the promoter is present in an amount sufficient to provide from about 1 to 12 atom percent of promoter metal to tin metal.

8. The method according to claim 1, wherein said step of preparing a mixed-metal oxide precursor solution comprises one of the following:
   mixing metal oxide precursor solutions; or
   mixing metal oxide precursor solutions in a solvent.

9. The method according to claim 8, wherein the mixed-metal oxide precursor solution further comprises the solvent methyl ethyl ketone (MEK).

10. The method according to claim 8, wherein:
the mixed-metal oxide precursor solution comprises a homogeneous solution; and
said step of oxidizing absorbed and adsorbed SnEH, CeEH and ZrEH to a tin oxide (SnO$_2$)/ceria/zirconia composite by heating the precursor solution comprising heating the substrate to 550-800 centigrade.

11. The method according to claim 8, wherein the mass ratio for the tin:cerium:zirconium is 1.0:0.5:0.5.

12. The method according to claim 1, wherein said step of applying the mixed-metal oxide precursor solution to a substrate comprises the step of applying the mixed-metal oxide precursor solution to a honeycomb-structured substrate by performing a single dip-deaerate-dip sequence.

13. A method for preparing a stabilized oxidation and reduction catalyst comprising the steps of:
preparing a mixed-metal oxide precursor solution comprising precursors for a first metal oxide which possesses more than one stable oxidation state including at least tin oxide and a second metal oxide including at least zirconium oxide;
applying the mixed-metal oxide precursor solution to a substrate, wherein the substrate does not include an aluminum compound;
treating the precursor solution to convert the mixed-metal oxide precursor solution to a mixed-metal oxide active layer;
dispersing a noble metal selected from the group consisting of platinum, palladium, gold, silver, and rhodium, on the surface of the mixed-metal oxide active layer;
wherein the mixed-metal oxide precursor solution comprises precursors for a third metal oxide selected from the group consisting of cerium oxide, lanthanum oxide, hafnium oxide, and ruthenium oxide;
wherein said step of preparing a mixed-metal oxide precursor solution comprises one of the following:
mixing metal oxide precursor solutions; and
mixing metal oxide precursor solutions in a solvent; and
wherein the mixed-metal oxide precursor solution comprises tin, cerium, zirconium-(II) ethyl hexonoate and the solvent methyl ethyl ketone (MEK).

14. A method for preparing a stabilized oxidation and reduction catalyst comprising the steps of:
preparing a mixed-metal oxide precursor solution comprising precursors for a first metal oxide which possesses more than one stable oxidation state including at least tin oxide and a second metal oxide including at least zirconium oxide;
applying the mixed-metal oxide precursor solution to a substrate, wherein the substrate does not include an aluminum compound;
treating the precursor solution to convert the mixed-metal oxide precursor solution to a mixed-metal oxide active layer;
dispersing a noble metal selected from the group consisting of platinum, palladium, gold, silver, and rhodium, on the surface of the mixed-metal oxide active layer;
wherein said step of preparing a mixed-metal oxide precursor solution comprises one of the following:
mixing metal oxide precursor solutions; and
mixing metal oxide precursor solutions in a solvent;
wherein said step of treating the precursor solution to convert the mixed-metal oxide precursor solution to a mixed-metal oxide active layer comprises at least one step of thermally treating the catalyst to eliminate solvent and convert the mixed-metal oxide precursor solution to a mixed-metal oxide coating; and
wherein said step of dispersing a noble metal selected from the group consisting of platinum, palladium, gold, silver, and rhodium, on the surface of the mixed-metal oxide active layer comprises the steps of:
quantitatively applying the noble metal from an aqueous solution to the mixed-metal oxide coating; and
thermally treating the catalyst.

15. A method for preparing a stabilized oxidation and reduction catalyst comprising the steps of:
preparing a mixed-metal oxide precursor solution comprising precursors for a first metal oxide which possesses more than one stable oxidation state including at least tin oxide and a second metal oxide including at least zirconium oxide;
applying the mixed-metal oxide precursor solution to a substrate, wherein the substrate does not include an aluminum compound;
treating the precursor solution to convert the mixed-metal oxide precursor solution to a mixed-metal oxide active layer;
dispersing a noble metal selected from the group consisting of platinum, palladium, gold, silver, and rhodium, on the surface of the mixed-metal oxide active layer; and
wherein said step of applying the mixed-metal oxide precursor solution to a substrate comprises the step of applying the mixed-metal oxide precursor solution to a honeycomb-structured substrate by performing a single dip-deaerate-dip sequence.

16. A method for preparing a stabilized oxidation and reduction catalyst comprising the steps of:
preparing a mixed-metal oxide precursor solution comprising precursors for a first metal oxide which possesses more than one stable oxidation state including at least tin oxide and a second metal oxide including at least zirconium oxide;
applying the mixed-metal oxide precursor solution to a substrate, wherein the substrate does not include an aluminum compound;
treating the precursor solution to convert the mixed-metal oxide precursor solution to a mixed-metal oxide active layer;
dispersing a noble metal selected from the group consisting of platinum, palladium, gold, silver, and rhodium, on the surface of the mixed-metal oxide active layer;
wherein the mixed-metal oxide precursor solution comprises precursors for a third metal oxide selected from the group consisting of cerium oxide, lanthanum oxide, hafnium oxide, and ruthenium oxide;
wherein said step of preparing a mixed-metal oxide precursor solution comprises one of the following:
mixing metal oxide precursor solutions; and
mixing metal oxide precursor solutions in a solvent; and
wherein:
the mixed-metal oxide precursor solution comprises a homogeneous solution of tin ethylhexanoate (SnEH), cerium (II) ethylhexanoate (CeEH) and zirconium (II) ethylhexanoate (ZrEH); and
said step treating the catalyst to convert the mixed-metal oxide precursor solution to a mixed-metal oxide active layer comprises oxidizing absorbed and adsorbed SnEH, CeEH and ZrEH to a tin oxide (SnO$_2$)/ceria/zirconia composite by heating the catalyst at a high temperature.

17. A method for preparing a stabilized oxidation and reduction catalyst comprising the steps of:
- preparing a mixed-metal oxide precursor solution comprising precursors for a first metal oxide which possesses more than one stable oxidation state including at least tin oxide and a second metal oxide including at least zirconium oxide;
- applying the mixed-metal oxide precursor solution to a substrate, wherein the substrate does not include an aluminum compound;
- treating the precursor solution to convert the mixed-metal oxide precursor solution to a mixed-metal oxide active layer:
- dispersing a noble metal selected from the group consisting of platinum, palladium, gold, silver, and rhodium, on the surface of the mixed-metal oxide active layer, the step of dispersing a noble metal on the surface of the mixed-metal oxide active layer comprising the steps of:
  - quantitatively applying the noble metal from an aqueous solution directly to the mixed-metal oxide active layer; and
- thermally treating the catalyst;
- adding at least one promoter metal selected from the group consisting of oxides of the metals of the transition series of the periodic table of elements, prior to the dispersing step; and
- wherein the noble metal is about 1 to about 50 weight percent, based on the total weight of the mixed-metal oxide active layer, and the first and second metal oxide together comprise about 50 to 99 weight percent, based on the total weight of the mixed-metal oxide active layer, and the promoter is present in an amount sufficient to provide from about 1 to 12 atom percent of promoter metal to tin metal.

\* \* \* \* \*